(No Model.) 2 Sheets—Sheet 1.
G. H. BROWER.
EVAPORATING PAN.
No. 556,957. Patented Mar. 24, 1896.
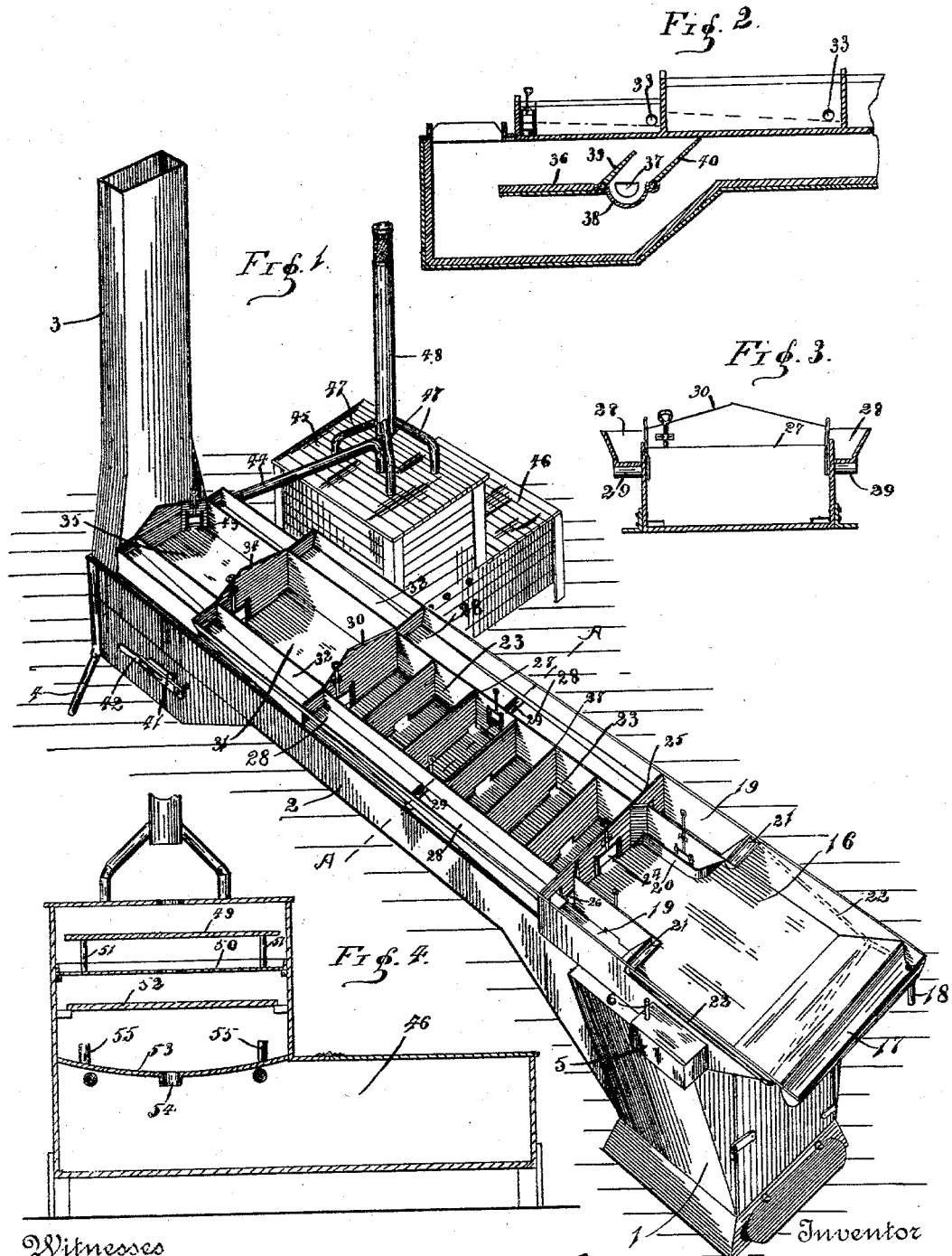

(No Model.) 2 Sheets—Sheet 2.
G. H. BROWER.
EVAPORATING PAN.
No. 556,957. Patented Mar. 24, 1896.
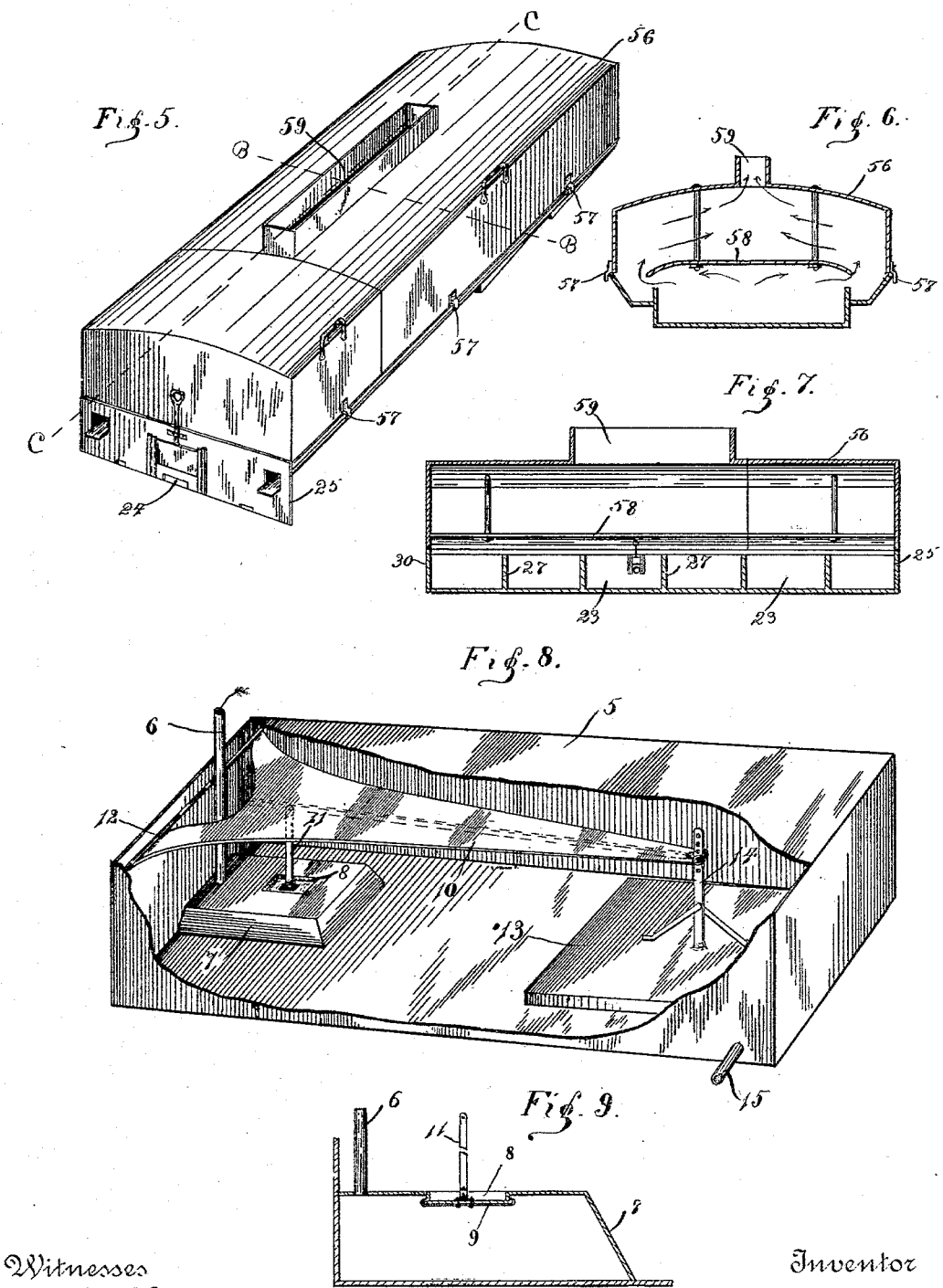
Witnesses
Geo. C. Conner.
L. A. Monroe.
Inventor
George H. Brower
By Attorney J. H. Lockwood

UNITED STATES PATENT OFFICE.

GEORGE H. BROWER, OF ROANN, INDIANA.

EVAPORATING-PAN.

SPECIFICATION forming part of Letters Patent No. 556,957, dated March 24, 1896.

Application filed November 22, 1894. Serial No. 529,547. (No model.)

*To all whom it may concern:*

Be it known that I, GEORGE H. BROWER, of Roann, county of Wabash, and State of Indiana, have invented certain new and useful Improvements in Sirup and Sugar Making Apparatuses; and I do hereby declare that the following is a full, clear, and exact description thereof, reference being had to the accompanying drawings, in which like numerals refer to like parts.

My invention relates to a sirup and sugar making apparatus for the purpose of thoroughly defecating and rapidly evaporating saccharine juices and performing its several functions automatically, so as to produce quickly a pure and high grade of sirup and sugar.

An object of my apparatus is to prevent the mixture of raw juice with partially concentrated and purified juice—in other words, to keep the various qualities of juices together. At the same time my apparatus is so constructed that the scum will be automatically thrown off and conducted to a place where it can be readily removed from the apparatus and the juice in the overflow with the scum be automatically returned to the portion of the apparatus containing juice of its same character, thus avoiding any mixture of juices of different degrees of treatment.

My apparatus is so constructed also that the material in passing from the compartment over the furnace into which the raw juice is introduced to the next compartment is conveyed to an intermediate cooling compartment or pocket, where the material is condensed, causing the scum to more freely rise and separate from the juice, enabling thereby the scum to be readily removed and the juice without the scum to flow into the next compartment. I also provide dampers to deflect the hot draft away from the last or finishing compartment of the evaporator to avoid scorching the material therein. A cooling device is also attached which greatly facilitates the cooling and final preparation of the sirup. I provide also a regulative feed device to regulate the flow of the raw juice into the first compartment.

The various features of my invention will appear more fully from the accompanying drawings and the description following.

Figure 1 is a perspective of my sirup and sugar making apparatus with the cover removed. Fig. 2 is a central longitudinal section of the rear end of the evaporating apparatus. Fig. 3 is a cross-section of the evaporating apparatus on the line A A, Fig. 1. Fig. 4 is a central longitudinal vertical section of the cooling apparatus. Fig. 5 is a perspective of the cover. Fig. 6 is a cross-section of the same on the line B B. Fig. 7 is a longitudinal vertical section thereof on the line C C. Fig. 8 is a perspective of the feed-regulator, the top and a portion of one side being broken away to show the interior. Fig. 9 is a central longitudinal vertical section of the valve mechanism in the regulator.

I provide upon a suitable foundation a furnace 1 made in any desired manner with a flue 2 extending back to a chimney 3. The rear end may be supported on legs 4 or any other suitable means. Upon this furnace and flue is placed the evaporating apparatus, which consists of a series of compartments extending from one end to the other for the reception of the juice. The raw juice is first introduced into the feed-regulating device 5 (shown more fully in Fig. 8) through the pipe 6, which enters the valve-box 7. In the upper side of this box there is an opening 8 adapted to be closed by a vertically-movable valve 9, that is operated by a lever 10, to which the valve is connected by a link 11. The lever 10 is hinged to one end of the box at 12 and is actuated at the other end by a floater 13 which is connected to the lever by an arm 14 adjustably pivoted thereto, as shown in Fig. 8. The valve 9 I preferably make of a piece of sheet metal lined with felt to make a tight joint. The link 11 is pivoted to the valve in order that the valve may accommodate itself to the opening to be closed. The floater 13 is hollow and made out of tin, so that it will be buoyant; but it may be otherwise constructed. 15 is an outlet-pipe from the feeding device entering the compartment 16 of the evaporating-pan. By this construction it is apparent that when the feed-box becomes too full the floater 13 will be elevated, which will cause the lever 10 to move upward and lift the valve 9 until it closes the orifice 8. It is observed also that the incoming juice in the valve-box 7 will push against the valve 9 while it is closed and tend to keep it closed instead of acting in the opposite way as in the feed devices which I have heretofore seen.

The compartment 16 of the evaporating apparatus is directly over the furnace, and into it the raw juice is first introduced from the feed-regulator. It is preferably introduced at the front end and flows to the rear end of such compartment, by which time it begins to boil. The boiling of course throws off scum toward the front end. The front wall of the compartment 16 is preferably sloping, as shown in Fig. 1, and the scum which is thrown toward that end of the compartment is raked off into the scum-trough 17, which has an outlet-tube 18 that conveys the scum into any suitable vessel for its removal. It is apparent that the juice in the front end of this compartment never boils because of the incoming cold juice. The juice in the front end of this compartment is also kept cool by the extension of the bottom beyond the furnace, the inclined front part of such compartment not being over the furnace and the sides also extending slightly beyond the furnace.

From the compartment 16 over the furnace the boiled portion of the juice is conducted to side pockets or compartments 19 through a narrow passage-way between the pocket or compartment 19 and the wall or upwardly-extending flange 20. The juice enters the rear end of this passage-way through a suitable opening and moves toward the front of the evaporating device, passing in through the wall of the pocket 19 through a suitable gate. The pocket or compartment 19 is not over the furnace or hot flue, whereby the entering fluid is cooled and condensed, causing a rapid separation of the impurities and scum from the juice. The former rise to the top and are raked off into the small scum-troughs 21, from which they are conveyed by the pipes 22 to a suitable receptacle outside the apparatus. The fluid does not pass from the compartment 16 directly into the series of compartments 23, the gate 24 in the partition 25 being used solely for cleaning the evaporation-pan. The impurities and scum having been separated from the boiled material in the compartments 19, they pass through suitable gates 26 in the partition 25 into the compartment 23, which is over the flue 2 and wherein the juice is subjected to intense heat. The compartment 23 is divided into sections by several movable partitions 27, which are provided with suitable openings for the passage of juice from one section to another. The opening in some of these partitions is in the middle and in some at the ends, so that they do not register with each other, and thereby cause the juice to move in a serpentine direction from side to center and from center to side and be distributed better over the surface of the evaporation-chamber.

On each side of the compartment 23 are side troughs 28 with their bottoms inclined toward the front part of the evaporation apparatus, whereby the troughs empty into the pockets or compartments 19. To the rear of the middle of these side troughs are small cross-troughs 29 that empty directly into the compartment 23. The juice in the compartment 23 being subjected to intense heat boils and throws the scum toward and into the side troughs 28. This overflow consists partly of scum and partly of juice and flows toward the front part of the evaporation apparatus. The juice in the overflow—that is, in the rear ends of the side troughs—is caught by the little cross-troughs 29 and conveyed back into the portion of the compartment from which it was thrown, thereby keeping juice of the same density together. The opening of the cross-trough 29 into the compartment 23 is provided with a gate whereby it can be closed or adjusted, so that all such juice will not be returned, but enough left in the side troughs to convey the scum into the pockets or compartments 19. The scum entering the pockets 19 is raked off, and the juice that enters from the side trough returns to the compartment 23. The sides of the side trough 28 are inclined so that the troughs will be flaring in cross-section and thus give greater cooling-surface to the troughs, and the troughs are not located over the flue, so that the overflow from the compartments into these side troughs is quickly cooled and condensed, thus facilitating the separation of the juice and scum and causing more rapid evaporation.

From the compartment 23 the treated juice is conveyed through a suitable gate in the partition 30 at the rear end and into the compartment 31, which is not provided with partitions, but is located over the heated flue, where the juice is further boiled and purified, the scum being thrown off, as before, into the side troughs 32 inclined toward the front, from which it is removed by a suitable skimmer, there being openings 33, through which the juice in the overflow of the side troughs is returned to the compartment from which it was thrown. The material passes from the compartment 31 through a suitable gate in the partition 34 into the finishing-compartment 35, which is likewise provided with side troughs and openings similar to those of the preceding compartment.

The material having been pretty fully treated by the time it has reached the finishing-compartment 35, there is often danger of its burning or scorching if subjected to the intense heat. Hence I provide means of deflecting the hot current from the furnace away from the bottom of such compartment, adopting the means shown in Fig. 2. I provide a suitable diaphragm 36 with cold-air inlets 37 on each side opening into a conduit 38. A narrow damper 39 is hinged to the rear of the conduit 38 and a broader damper 40 hinged to the front part of the conduit 38. The damper 40 when operated closes the short circuit of the hot current through the flue to the chimney and deflects it down under the diaphragm 36. When it is not operated, it closes the passage-way under the diaphragm 36, thus enabling the hot current to pass directly to the chimney. When the damper 40 is operated as shown in Fig. 2 the smaller damper 39 is also operated, allowing cold air to enter the apertures 37, pass up over the damper 39 and come in direct contact with the bottom of the finishing-compartment 35, thus cooling the material. When the dampers are closed down, the rear damper closes the conduit 38 and shuts off the supply of cold air. I provide a means on the outside for operating these two dampers simultaneously. It consists preferably of a crank 41 attached to one damper and a crank 42 attached to the other, such cranks being parallel with each other and a handle on one crank to actuate them, the other crank being connected to the first by a pin secured to it and operating in a longitudinal slot in the crank that has the handle. By this construction I am enabled to subject the material in the finishing-chamber to such degree of heat as I may desire or to cold air.

In the rear corner of the finishing-chamber 35 the fluid passes through the gate 43 and a pipe 44 into the cooler 45. The cooler is shown here resting upon the sirup-tank 46. From its top there extends a series of pipes 47, uniting in one main pipe 48, through which the hot air and steam may escape. Within the cooler 45 are placed a series of shelves. The incoming current is deposited first on the shelf 49 that is preferably filled level and has passage-ways about its edges to enable the sirup to flow down on the shelf or pan 50, which extends to the sides of the cooler and has a central opening for the escape of the sirup from it. I construct these two shelves by placing the lower one 50 on suitable lugs secured to the sides of the cooler and supporting the first one 49 by lugs 51 resting on the lower shelf 50. By this means I am enabled to remove them both and also the lower shelf 52, on which the sirup from the shelf 50 is deposited, and which has passage-ways about its edges for the escape from it of the sirup to the bottom 53 of the cooler. This shelf 52 may be supported by lugs and made so that its edges will not contact with the sides of the cooler, but leave a passage-way between the two. The bottom 53 is preferably concave, with an opening 54 for the passage of the sirup into the sirup-tank 46. Cool air from the outside is admitted into the cooler by a series of tubes 55 whose inner ends extend up from the bottom 53 far enough to prevent any sirup from entering them. By having this series of pipes in the bottom for the admission of cold air and the pipes 47 and 48 at the top for the escape of hot air and steam I maintain a current through the cooling-chamber, and as the sirup on the shelves is necessarily spread thin and distributed it is very rapidly cooled. It is apparent from this construction of the cooler that the cold air in passing up must pass through the same passage-ways as the sirup in coming down, and thereby come into close contact with the sirup, and by extending the pipes 47 and 48 up as they are shown a stronger draft of the cold air through the cooler is secured. In order to secure this rapid evaporation, as heretofore described, with a lower degree of heat, I provide for the compartments 23, 31, and 35 of the evaporation apparatus a suitable cover 56, as shown in Figs. 5, 6, and 7. This cover is preferably hinged on one side to the evaporating-pans and has brackets 57 to rest on the other side of such pans and is provided with suitable handles whereby it can be opened and turned back for any purpose.

From the top portion of the cover I suspend a diaphragm 58, as shown in Fig. 6, with its sides slightly curved downward and extending slightly beyond the sides of the evaporation-compartments, but with its ends extending entirely to the ends of the cover, as shown in Fig. 7. This diaphragm 58 is held preferably about three inches above the sides of the evaporating-compartments. The juice in the evaporating-compartments will boil up and come in contact with this diaphragm and it will cause the scum to be conveyed to the sides and deposited in the side trough. The side troughs are not subjected to any heat from the flue, and therefore the overflow into them will cool and the evaporation therefrom will pass upward out of the opening 59, which I have provided in the top of my cover and to which a flue may be attached if desired.

At the close of the day's work by closing the gate between the compartment 16 and the compartment 23 I am able to fill the compartment 16 with water and continue the further treatment of the juice in the other compartments.

Each compartment being separated from the others by a partition and gate can be filled with water as the day's work is being closed.

I claim—

1. In an evaporating apparatus the combination with suitable heated compartments, of a cool side compartment or scum-pocket, walls forming a passage-way from the rear end of the front heated compartment to the front end of the scum-pocket and an opening from the rear end of the scum-pocket into the front end of the next heated compartment.

2. In an evaporating apparatus, the combination with suitable heated compartments, of a cool compartment or scum-pocket through which the material is adapted to pass from one heated compartment to the other, and a scum-trough leading from the scum-pocket to a point outside the apparatus.

3. In an evaporating apparatus the combination with two heated compartments, of cold compartments or scum-pockets through which the material passes from one heated compartment to the other, and inclined scum-troughs alongside the rear heated compartment and emptying into the scum-pockets whereby the overflow in the scum-troughs cannot enter the first heated compartment but will be returned to the compartment from which it came.

4. The combination with suitable heated compartments, of cool compartments or scum-pockets through which the material passes from one to the other heated compartment, scum-troughs alongside the second heated compartment inclined toward and emptying into the scum-pockets, and suitable cross-troughs in such scum-troughs whereby the juice of the overflow is returned to the portion of the compartment from which it came.

5. In an evaporating apparatus, a compartment located over the fire and into which the juice is received, a cool compartment or scum-pocket with an opening between it and the preceding compartment, a series of succeeding compartments with an opening from such scum-pocket into them, and a cool scum-trough extending alongside such latter compartments inclined downward toward and emptying into such scum-pocket.

6. The combination with suitable evaporating-compartments, of a flue thereunder enlarged beneath the finishing evaporating-compartment, the horizontal diaphragm 36 placed substantially central within the enlarged portion of the flue, the trough 38 connected with the front edge of such diaphragm, the air-inlet 37 at the end of such trough, the damper 39 hinged to the front end of such diaphragm and adapted to cover and close the trough 38 and the damper 40 hinged to the front edge of the trough and contacting with either the lower or upper wall of the flue whereby the heated current may be passed under or over the diaphragm and the cold air be admitted or shut out as desired.

In witness whereof I have hereunto set my hand this 9th day of November, 1894.

GEORGE H. BROWER.

Witnesses:
 S. M. BAKER,
 THOS. J. BROWER.